(12) United States Patent
Gramenz

(10) Patent No.: US 9,446,704 B1
(45) Date of Patent: Sep. 20, 2016

(54) TIE DOWN

(71) Applicant: David Gramenz, Invergrove Heights, MN (US)

(72) Inventor: David Gramenz, Invergrove Heights, MN (US)

( * ) Notice: Subject to any disclaimer, the term of this patent is extended or adjusted under 35 U.S.C. 154(b) by 0 days.

(21) Appl. No.: 14/674,745

(22) Filed: Mar. 31, 2015

(51) Int. Cl.
*B66D 1/00* (2006.01)
*B60P 7/08* (2006.01)

(52) U.S. Cl.
CPC .............. *B60P 7/083* (2013.01); *B60P 7/0823* (2013.01)

(58) Field of Classification Search
CPC ............ B66D 1/04; B66D 1/06; B66D 1/34; B66D 3/02; B66D 3/12; B66D 3/14; B66D 3/16; B60P 7/06
USPC .......................................... 254/218, 221, 223
See application file for complete search history.

(56) References Cited

U.S. PATENT DOCUMENTS

| | | | |
|---|---|---|---|
| 2,557,499 A | 6/1951 | Davis | |
| 2,891,824 A * | 6/1959 | Fulton ...................... | B66D 1/06 254/357 |
| 4,106,754 A * | 8/1978 | Kucher .................... | B66D 1/06 114/251 |
| 4,456,227 A * | 6/1984 | Notenboom ............. | B66D 1/06 254/350 |
| 4,693,453 A * | 9/1987 | Ivan ....................... | B62D 43/045 254/323 |
| 5,490,749 A * | 2/1996 | Arbues .................... | B60P 7/083 24/68 CD |
| 6,431,525 B1 * | 8/2002 | Roll ........................ | B66D 1/04 254/357 |
| 6,698,723 B1 | 3/2004 | Antonini | |
| 6,880,810 B1 * | 4/2005 | Hu .......................... | B60P 7/083 24/69 ST |
| 7,585,140 B1 | 9/2009 | Howes et al. | |
| 8,099,836 B2 | 1/2012 | Breeden et al. | |
| 8,434,979 B1 | 5/2013 | Genge | |
| 8,458,859 B2 * | 6/2013 | Degen ..................... | B25B 1/205 24/68 CD |
| 8,973,222 B2 * | 3/2015 | Breeden .................. | B60P 7/083 24/68 CD |
| 2010/0295004 A1 * | 11/2010 | Huang ................... | B60P 7/0846 254/218 |
| 2011/0067210 A1 | 3/2011 | Huang | |
| 2012/0298938 A1 * | 11/2012 | Anderson ................ | B66D 1/04 254/376 |
| 2015/0197413 A1 * | 7/2015 | Doig ....................... | B66D 1/04 414/800 |

* cited by examiner

*Primary Examiner* — Emmanuel M Marcelo
(74) *Attorney, Agent, or Firm* — Winthrop & Weinstine, P.A.

(57) ABSTRACT

The Tie Down includes: a) a hub including, a Trace configured to engage with a Tensioning Element, at least one Rim including an Edge set of teeth, and at least one Rim including a Side set of teeth; b) a high speed winding mechanism engaging with the Edge set of teeth; and c) a slide lock engaging with the Side set of teeth.

9 Claims, 3 Drawing Sheets

US 9,446,704 B1

TIE DOWN

CROSS REFERENCE TO RELATED APPLICATIONS

There are no applications related to this application.

STATEMENT REGARDING FEDERALLY SPONSORED RESEARCH OR DEVELOPMENT

No invention claimed in this application was made under Federally sponsored research or development.

THE NAMES OF THE PARTIES TO A JOINT RESEARCH AGREEMENT

Not Applicable

REFERENCE TO A SEQUENCE LISTING

Not Applicable

BACKGROUND OF THE INVENTION

1. Field of the Invention

The Tie down relates to the field of devices which provide tensioning to elements used to secure loads, usually to vehicles, or to secure vehicles to anchor points.

2. Description of Related Art

A number Tensioning devices are known in the art. Some of these operate by using friction to lock the tensioning element in place after the user has applied tension and the Tensioning device causes the tensioning element to lock in place by friction. U.S. Pat. No. 2,557,499, to Davis, U.S. Pat. No. 8,099,836 to Breeden, U.S. Pat. No. 7,585,140, to Howes et al, and U.S. Pat. No. 6,698,723, to Antonini, are typical of this class of tensioning device.

Another class of tensioning devices operates by wrapping a tensioning element around a reel or spool and locking the reel or spool in place by means of a ratchet assembly and torque is applied via a gear train to provide mechanical advantage to the user. U.S. Pat. No. 8,434,979, to Genge, and Published US Patent Application 20110067210, by Huang, are typical of this class of tensioning device.

BRIEF SUMMARY OF THE INVENTION

The Tie Down comprises: a) a hub including, a Trace configured to engage with a Tensioning Element, at least one Rim including a Edge set of teeth, and at least one Rim including a Side set of teeth; b) a high speed winding mechanism engaging with said Edge set of teeth; c) a slide lock engaging with said Side set of teeth; d) a Spring biased pawl which engages said Edge set of teeth to act as a ratchet to prevent said hub from rotating to release tension applied to said Tensioning Element; a First cover; and an Axle rotatably attaching said hub to said First cover. A Second cover is provided to act as a support for the axle and when a second slide lock is included the second cover may also serve to restrain the second slide lock in a manner similar that described below for the first cover.

BRIEF DESCRIPTION OF THE SEVERAL VIEWS OF THE DRAWINGS

FIG. 4 is a section view of the Tie Down showing the cruciform pass through.

DETAILED DESCRIPTION OF THE INVENTION

Figures 1, 1A, 1B:
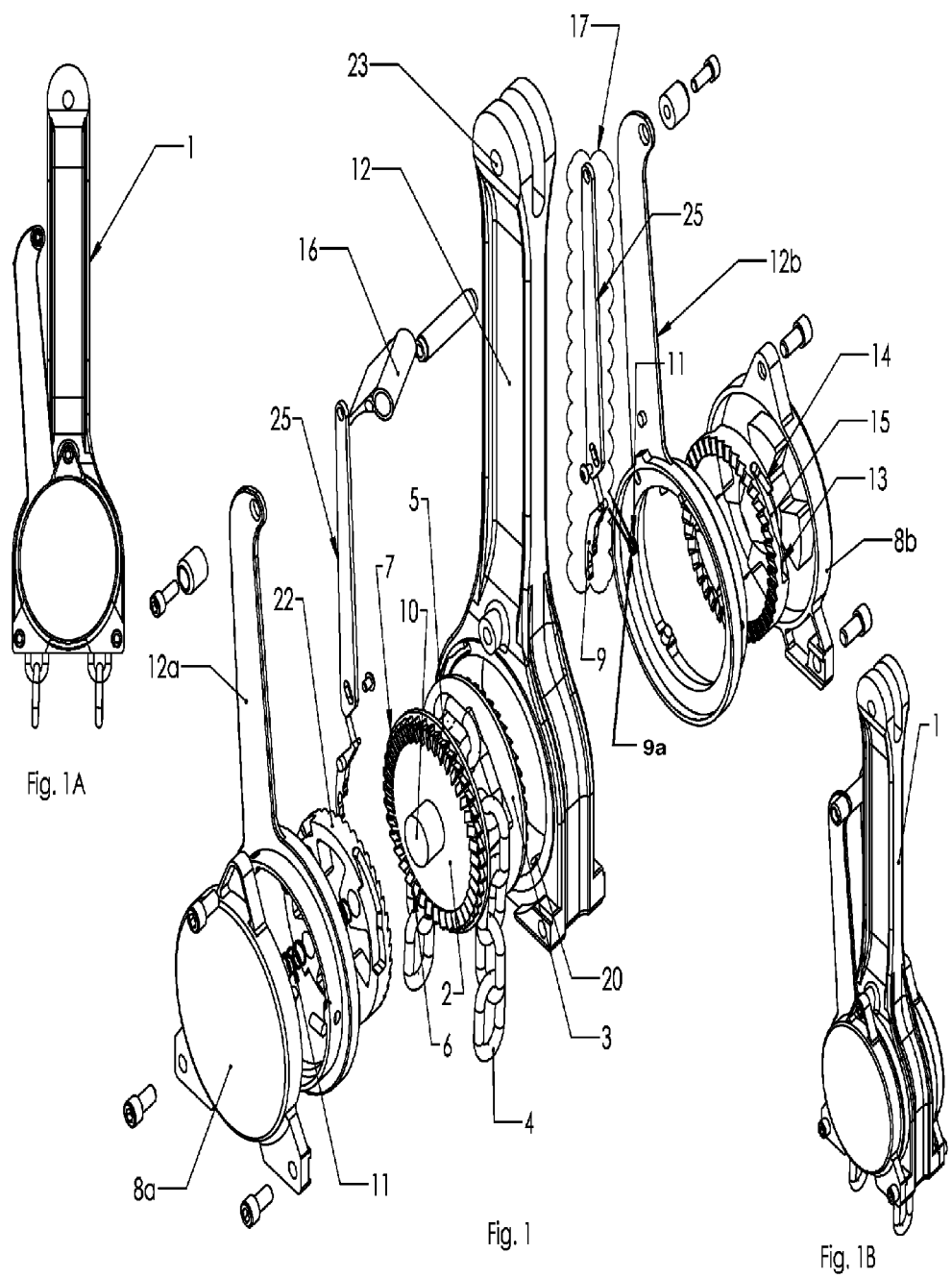
FIG. 1 is an exploded view of the Tie Down.
FIG. 1a is an end view of the Tie Down.
FIG. 1b is a perspective view of the Tie Down.
Figure 2:
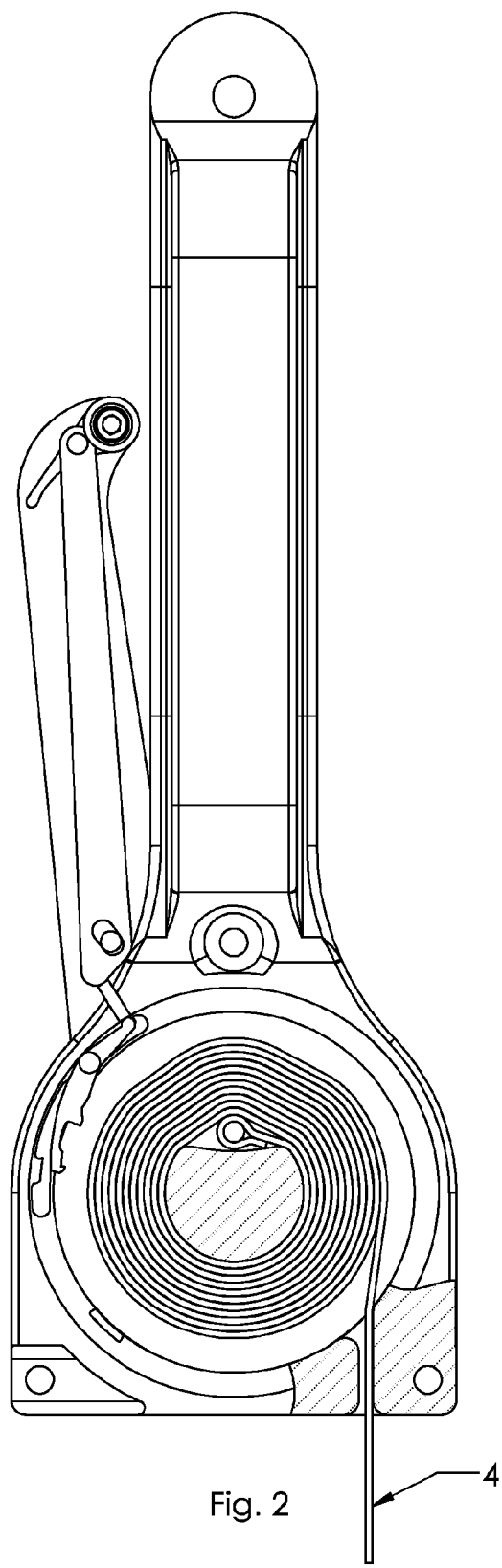
FIG. 2 is a section view of the Tie Down showing the use of a Strap as the Tensioning Element.
Figure 3:
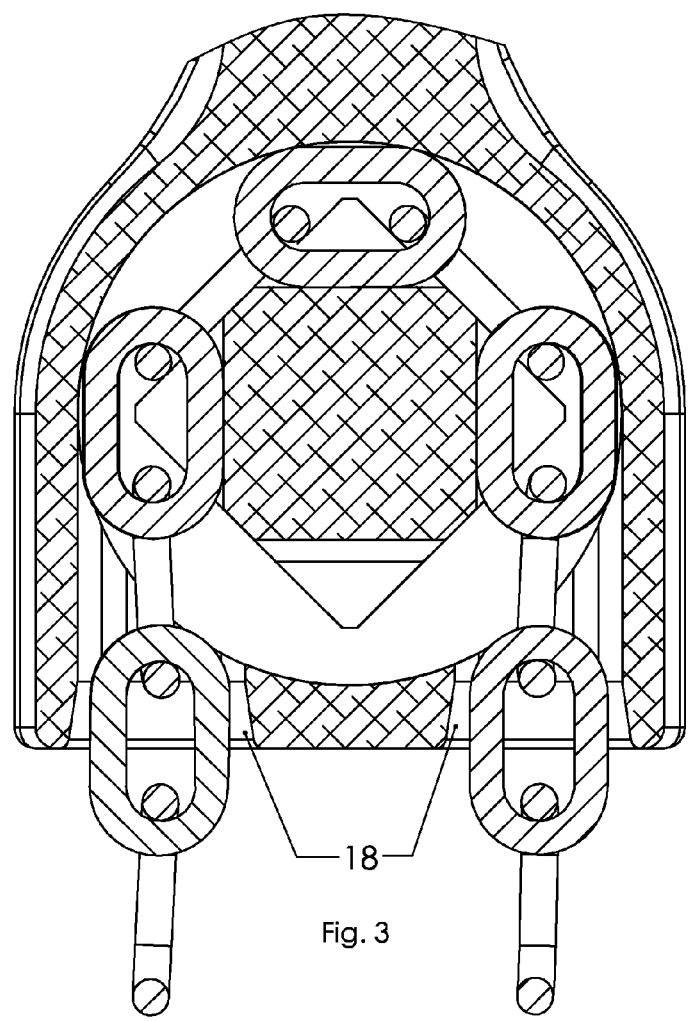
FIG. 3 is a section view of the Tie Down showing the use of a chain as the tensioning element.
Figure 4:
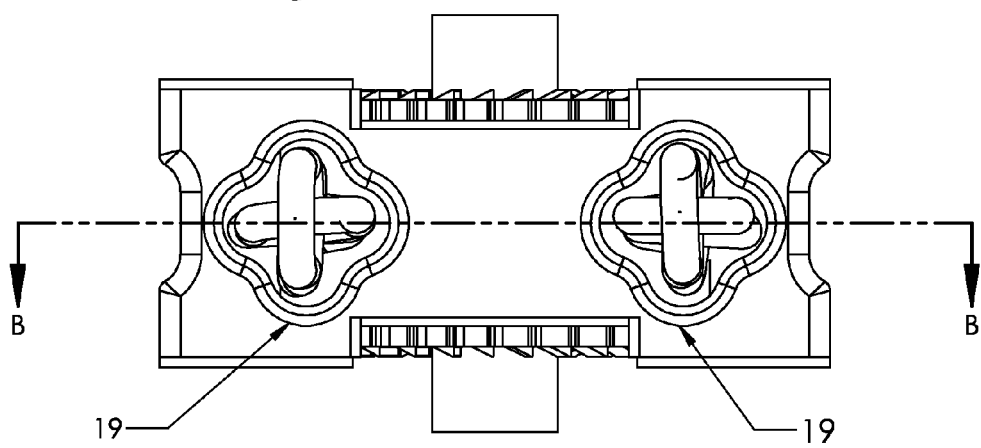

The Tie Down 1 comprises: a) a hub 2 including, a Trace 3 configured to engage with a Tensioning Element 4, at least one Rim 5 including a Edge set of teeth 7, and at least one Rim 5 including a Side set of teeth 6; b) a high speed winding mechanism engaging with said Edge set of teeth 7; c) a slide lock 22 engaging with said Side set of teeth 6; d) a Spring biased pawl 9 which engages said Edge set of teeth 7 to act as a ratchet to prevent said hub 2 from rotating to release tension applied to said Tensioning Element 4; a First cover 8a; and an Axle 10 rotatably attaching said hub 2 to said First cover 8a. A Second cover 8b is provided to act as a support for the axle 10 and when a second slide lock 22 is included the second cover may also serve to restrain the second slide lock 22 in a manner similar that described below for the first cover 8a.

The hub 2 includes at least one Trace 3 configured to engage with a Tensioning Element 4. Said Tensioning Element 4 may be composed of metal, wire, carbon fiber, elastic material, or fibrous material such as hemp and may be in the form of a chain, rope, strap or wire. Whatever, configuration the Tensioning Element 4 may take at least one Trace 3 is configured to Grip the Tensioning Element 4. By way of example if the Tensioning Element 4 is in the form of a chain the Trace 3 will have a number of indentations sized and placed to force the chain to pass over the Trace 3 when the Trace 3 rotates. By way of further example, if the Tensioning Element 4 is a fiber strap the Trace 3 would be configured with a hole through which the strap is passed to force the strap to wrap around the Trace 3. In yet another example, the Trace 3 may be provided with a hole through which a wire, rope, or single filament line would pass to cause the wire, rope, or single filament line to wrap around the Trace 3. The hub 2 may be equipped with any combination of Traces 3 to provide flexibility in the choice of Tensioning Element 4 for a particular application., however at least one Trace 3 must be provided per hub 2.

The hub 2 includes at least one Rim 5. The Rim 5, or Rims 5, is, or are, attached to the Trace 3 to form the hub 2. at least one Rim 5 includes a Edge set of teeth 7 configured to engage with a Spring biased pawl 9 to prevent rotation of the hub 2 when so engaged. The Pawl Biasing spring 9a urges the Spring Biased Pawl 9 to engage with the edge set of teeth 7. The teeth of the Edge set of teeth 7 are positioned along the outer circumference of the Rim 5. The sides of the Edge set of teeth 7 are in a plane parallel to the plane of the face of the Rim 5. The teeth of the Side set of teeth 6 are configured to engage with a slide lock 22 preferably in the form of a wheel with teeth formed to interlock with the Side set of teeth 6. Each side of each tooth of the Side set of teeth 6 is in a plane perpendicular to the face of the Rim 5. The hub 2 may be attached to the Axle 10 or may be rotatably mounted on an Axle 10. Said Axle 10 is attached to the First cover 8a, or may extend through the First cover 8a. The Axle 10 may or may not be rotatably attached to the First cover 8a. The cross section of the axle 10 may be circular, serrated, or of any polygon shape. The axle 10 may include any number splines or serrations or any combinations of serrations or splines.

The slide lock 22 includes at least one wheel slideably mounted on the Axle 10 and provided with a set of teeth to engage said Side set of teeth 6. The high speed winding mechanism includes one or more Springs 11 which urge the slide lock 22 toward the Rim 5 of the hub 2. The slide lock 22 is slideably attached to the First cover 8a to prevent the hub 2 from rotating relative to the First cover 8a. The slide lock 22 prevents rotation in a direction which releases tension on the Tensioning Element 4 when the teeth of the slide lock 22 are engaged with said Side set of teeth 6. When the slide lock 22 is fully disengaged from the Side set of teeth 6 the hub 2 will rotate freely to release tension on the Tensioning Element 4.

The Slide Lock 22 is provided with a Slot having three portions. A Handle 12a is inserted into the Slot. In the Tie Down 1 where more than one Slide Lock 22 is provided this Slot may be provided for each Slide Lock 22 and may be provided in mirror image of one another. The Lock portion of the control slot 13 is configured so that when the Handle 12a is placed therein the Handle 12a forces the teeth of the Slide lock 22 to engage with the Side set of teeth 6 to lock the hub 2 in a fixed position. When the Handle 12a is placed in the Release Portion of the Control Slot 14 the teeth of the Slide Lock 22 are fully disengaged from the Side set of teeth 6 thus allowing the hub 2 to rotate freely and release tension in the Tensioning Element 4. When the Handle 12a is placed in the Ratcheting portion of the Control Slot 15, the Springs 11 urge the Slide Lock 22 to move toward the hub 2 and thereby engage the teeth of the Slide Lock 22 with the Side set of teeth 6 thus permitting the Slide Lock 22 to rotate in one direction which causes the hub 2 to rotate so as to increase tension on the Tensioning Element 4 and to move in the opposite direction which permits the teeth of the Slide Lock 22 to slide over the Side set of teeth 6 and reengage when the user stops moving the Slide lock 22. The Slide Lock 22 also includes a Flop lever 16 which the operator uses to operate the Slide Lock 22. The Slide Lock 22 comprises a ring shaped gear having a set of teeth which engage in said Side set of teeth 6

The Tie Down 1 may further comprise a Release Mechanism 17 which holds said Spring biased pawl 9 in a disengaged position for high speed unwinding.

The First cover 8a includes a Pass Through 18 to provide smooth entrance and egress of the Tensioning Element 4. The pass-through may be of any shape to facilitate passage of the Tensioning Element 4. For example a Bell Mouth 19 shape for the pass-through would serve to minimize wear on a Tensioning Element 4 of circular cross section. A cruciform Pass Through 18 would serve to guide chain links into proper alignment. A cruciform Pass Through 20 with a Bell Mouthed profile would serve to align chain links and minimize wear on a chain. The First cover 8a includes a connection point 23 for attaching a chain, rope, strap, or other device to attach the Tie Down 1 to an airplane, truck, car, tent, or anything which needs to be fastened to the ground, runway, Truck bed or other secure object. The First cover 8a may include a center portion of case 12 to constrain the movement of the hub 2 to rotary motion controlled by the slide lock 22 and spring biased pawl 9. The First cover 8a may further include covers. The Main Portion of the case 12 includes a connection point 23 for attaching the Tie Down 1 to an object to be tied down 26, such as an airplane, truck load, or other object requiring attachment to a base or fitting.

A Fast Rewind Device may be attached to the First cover 8a. Said Fast Rewind Device having a spline, or equivalent, attachment to the Axle 10. Said Fast Rewind Device converts linear motion imparted by an operator into circular motion to impart torque to the Axle 10 of the Tie Down 1 when a rope, chain, strap, or the equivalent, portion of the Fast Rewind Device is pulled by a user.

SEQUENCE LISTING

Not Applicable

I claim:

1. A tie down comprising:
   a) a hub, comprising:
      a trace configured to engage with a chain; and
      a rim including an edge set of teeth and a side set of teeth;
   b) a slide lock engaging with the side set of teeth;
   c) a spring biased pawl which engages the edge set of teeth to act as a ratchet to prevent the hub from rotating to release tension applied to the chain;
   d) a housing at least partially enclosing the hub and slide lock; and
   e) an axle rotatably attaching said hub to the housing.

2. The tie down of claim 1, wherein the slide lock comprises:
   a) a ring shaped gear comprising a set of teeth which engage with the side set of teeth;
   b) a spring urging the ring shaped gear to engage with the side set of teeth;
   c) a slot in the ring shaped gear, the slot having a first, second, and third region; and
   d) a handle, the handle forcing the set of teeth of the ring shaped gear to engage with the second set of teeth when the handle is in the first region within the slot, the handle forcing the set of teeth of the ring shaped gear to disengage from the second set of teeth when the handle is in the third region, and the spring urging the set of teeth of the ring shaped gear to engage with the second set of teeth when the handle is in the second region to permit the ring shaped gear to operate as a ratchet in conjunction with the hub.

3. The tie down of claim 1, further comprising a release mechanism which holds the spring biased pawl in a disengaged position for high speed unwinding of the chain.

4. The tie down of claim 1, further comprising a bellmouth shaped pass through in the housing for the chain.

5. A tie down comprising:
   a) a hub comprising:
      a trace configured to engage with a tensioning element; and
      a rim including an edge set of teeth and a side set of teeth;
   b) a slide lock comprising:
      a ring shaped gear comprising a set of teeth which engage with the side set of teeth;
      a spring configured to urge the ring shaped gear to engage with the side set of teeth;
      a slot in the ring shaped gear, the slot having a first, second, and third region; and
      a handle, the handle forcing the set of teeth of the ring shaped gear to engage with the second set of teeth when the handle is in the first region within the slot, the handle forcing the set of teeth of the ring shaped gear to disengage from the second set of teeth when the handle is in the third region, and the spring urging the set of teeth of the ring shaped gear to engage with the second set of teeth when the handle is in the second region to permit the ring shaped gear to operate as a ratchet in conjunction with the hub;
c) a spring biased pawl which engages the edge set of teeth to act as a ratchet to prevent the hub from rotating to release tension applied to the tensioning element;
d) a housing at least partially enclosing the hub and slide lock; and
e) an axle rotatably attaching said hub to the housing.

6. The tie down of claim 5, further comprising a release mechanism which holds the spring biased pawl in a disengaged position for high speed unwinding of the tensioning element.

7. The tie down of claim 5, further comprising a bell-mouth shaped pass through in the housing for the tensioning element.

8. A tie down comprising:
a) a hub comprising:
   a trace configured to engage with a tensioning element; and
   a rim including an edge set of teeth and a side set of teeth;
b) a slide lock engaging with the side set of teeth;
c) a spring biased pawl which engages the edge set of teeth to act as a ratchet to prevent the hub from rotating to release tension applied to the tensioning element;
d) a housing at least partially enclosing the hub and slide lock, the housing comprising a bell-mouth shaped pass through for the tensioning element; and
e) an axle rotatably attaching said hub to the housing.

9. The tie down of claim 8, further comprising a release mechanism which holds the spring biased pawl in a disengaged position for high speed unwinding of the tensioning element.

* * * * *